S. L. Bond,
Boring Hubs.

Nº 26,245.    Patented Nov. 29. 1859.

Witnesses.    Inventor.

UNITED STATES PATENT OFFICE.

S. L. BOND, OF GREENWOOD, SOUTH CAROLINA.

HUB-BORING MACHINE.

Specification of Letters Patent No. 26,245, dated November 29, 1859.

*To all whom it may concern:*

Be it known that I, S. L. BOND, of Greenwood, in the district of Abbeville and State of South Carolina, have invented a new and Improved Hub Boring and Centering Machine; and I do hereby declare that the following is a full, clear, and exact description of the same, reference being had to the annexed drawings, making a part of this specification, in which—

Figure 1:
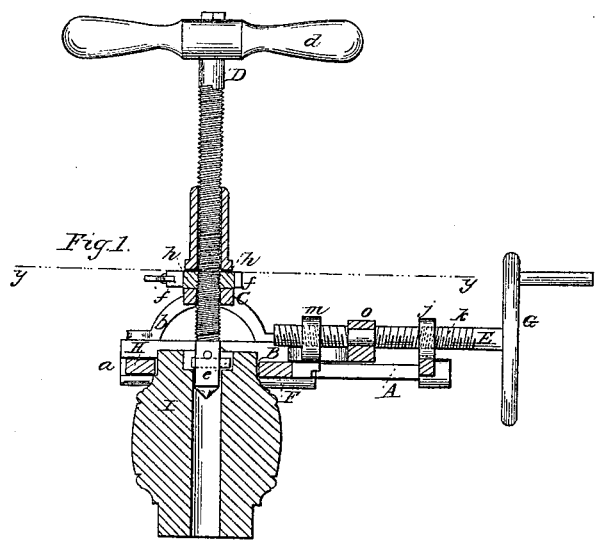
Figure 2:
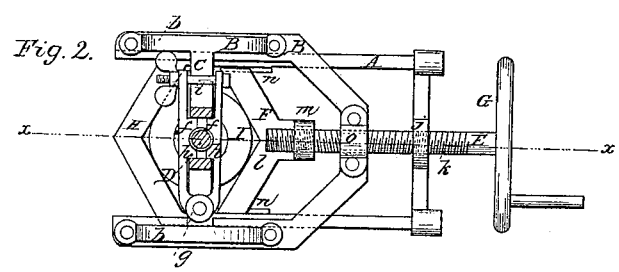

Figure 1, is a vertical central section of my invention, taken in the line $x$, $x$, Fig. 2; Fig. 2, a horizontal section of the same, taken in the line $y$, $y$, Fig. 1.

Similar letters of reference indicate corresponding parts in the two figures.

This invention consists in the combination of an auger or bit and a centering device arranged substantially as hereinafter described whereby hubs may be expeditiously and accurately centered and bored for the purpose of receiving their boxes.

To enable those skilled in the art to fully understand and construct my invention, I will proceed to describe it.

A, B, represent two metallic frames, one of which A, has itse sides fitted in grooves $a$, in the inner surface of the side pieces of the other B, as shown clearly in Fig. 1, so as to allow the two frames to be connected together and still admit of A, sliding freely in B. On the frame B, standards $b$ are attached one at each side, and these standards, are connected by a transverse bar C, through which a screw arbor D, passes loosely. Said arbor being properly supported by a socket $c$. The upper end of the screw arbor D, has a handle $d$, attached to it and to its lower end a bit $e$ is secured.

On the upper surface of the bar C, two rods $f$, $f$, are attached at one end by a pin $g$, and each rod $f$, has a half nut $h$, formed on it, which half nuts when the rods are adjusted together engage with the screw arbor D. The rods $f$, $f$, are locked by means of a screw bolt $i$, to keep the half nuts $h$, engaged with the screw arbor, see Fig. 2.

On the frame A, a nut $j$, is secured in which a screw shaft E, works. The shaft E, has reverse screw threads $k$, $l$, one of which $k$, is fitted in the nut, $j$, and the other $l$, in a nut $m$, attached to a V-shaped slide bar F, the ends of which are notched or grooved and fitted on projections $n$ at the inner sides of the frame A, as shown clearly in Fig. 2.

The screw shaft E, has a bearing $o$, between its two threads, said bearing being attached to the frame B. The outer end of the shaft E, is provided with a hand wheel G, and the end of frame A, opposite to the end which has the nut $j$, attached has a V-shaped transverse bar H, which is in the same plane as, but in a reverse position to, the V-shaped bar F, as clearly shown in Fig. 2.

The operation will be readily seen. The hub I, to be bored is grasped and secured between the two V-shaped bars F, H, said bars being adjusted so as to grasp the hub by turning the screw shaft E. The frame A, and bar F, being moved by turning shaft E. The bars F, H, center the hub in respect to the bit $e$, as the two bars move simultaneously in opposite directions and have always the same relative position with the bit. When the hub I is centered, the arbor D, is turned and the hub bored the requisite distance in one end. The hub is then reversed or inverted between the bars F, H, and bored the requisite distance in the opposite end.

This is a very simple and efficient device, one that may be constructed at a small cost and manipulated with the greatest facility. It will prove valuable in small shops where it would not pay to invest large sums in the expensive power machines devised for the purpose.

The bit $e$, it will be seen is drawn directly out from the hub by unlocking the rods $f$, $f$, so that the half nuts $h$, will be freed from the arbor, it being understood that the screw thread on the arbor and the half nuts $h$, when closed feed the bit to its work.

I am aware that V-shaped jaws arranged to move simultaneously in opposite directions have been employed for centering articles, and I do not claim broadly such parts irrespective of arrangement and separately considered, but, I do claim as new and desire to secure by Letters Patent—

The V-shaped bars or jaws F, H, in combination with the bit-arbor D, when the whole are arranged substantially as shown to operate as and for the purpose set forth.

S. L. BOND.

Witnesses:
W. I. McKELLAR,
J. M. HILL.